(12) United States Patent
Hu

(10) Patent No.: US 12,370,445 B2
(45) Date of Patent: Jul. 29, 2025

(54) COMPUTER IMPLEMENTED METHOD OF SCALABLY GENERATING GAMING ASSETS FOR RENDERING DURING GAMEPLAY

(71) Applicant: Activision Publishing, Inc., Santa Monica, CA (US)

(72) Inventor: Lei Hu, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 460 days.

(21) Appl. No.: 18/050,671

(22) Filed: Oct. 28, 2022

(65) Prior Publication Data
US 2023/0149810 A1    May 18, 2023

Related U.S. Application Data

(60) Provisional application No. 63/263,957, filed on Nov. 12, 2021.

(51) Int. Cl.
*A63F 13/52* (2014.01)
*A63F 13/60* (2014.01)

(52) U.S. Cl.
CPC .............. *A63F 13/52* (2014.09); *A63F 13/60* (2014.09)

(58) Field of Classification Search
CPC ........... A63F 13/60; A63F 13/63; A63F 13/52
See application file for complete search history.

(56) References Cited

U.S. PATENT DOCUMENTS

| 5,530,796 | A | 6/1996 | Wang |
| 5,561,736 | A | 10/1996 | Moore |
| 5,563,946 | A | 10/1996 | Cooper |
| 5,685,775 | A | 11/1997 | Bakoglu |

(Continued)

FOREIGN PATENT DOCUMENTS

| AU | 768367 | 3/2004 |
| AU | 2005215048 | 10/2011 |

(Continued)

OTHER PUBLICATIONS

Erikson, "Hierarchical Levels of Detail to Accelerate the Rendering of Large Static and Dynamic Polygonal Environments" University of NC Chapel Hill 2000 (Year: 2000).

(Continued)

*Primary Examiner* — James S. McClellan
(74) *Attorney, Agent, or Firm* — Novel IP

(57) ABSTRACT

The present specification describes a method of generating one or more customized gaming assets of a generic gaming asset for a video game, including receiving, using a GUI generated by a module implemented in a host computer, a first response from a user representative of data indicative of the generic gaming asset, receiving, using a second GUI generated by the module, a second response from the user representative of second data indicative of selected one or more parameters associated with the generic gaming asset, receiving, using a third GUI generated by the module, a third response from the user representative of third data indicative of at least one relationship of at least two of the one or more parameters, and causing, by the module, a display of the one or more customized gaming assets based on the first, second and third responses.

18 Claims, 10 Drawing Sheets

(56) References Cited

U.S. PATENT DOCUMENTS

| | | |
|---|---|---|
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,764,232 A | 6/1998 | Oouchi |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 * | 1/2002 | Kinoe .................. G06F 3/0481 715/850 |
| 6,353,449 B1 | 3/2002 | Gregg |
| 6,356,297 B1 | 3/2002 | Cheng |
| 6,411,312 B1 | 6/2002 | Sheppard |
| 6,421,051 B1 | 7/2002 | Kato |
| 6,426,750 B1 | 7/2002 | Hoppe |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,574 B1 | 7/2004 | Mao |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |

(56) References Cited

U.S. PATENT DOCUMENTS

| | | |
|---|---|---|
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,243,064 B1 | 8/2012 | Moravanszky |
| 8,245,241 B2 | 8/2012 | Hamilton, II |
| 8,245,283 B2 | 8/2012 | Dawson |
| 8,265,253 B2 | 9/2012 | D Amora |
| 8,281,281 B1 | 10/2012 | Smyrl |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,390,623 B1 | 3/2013 | Guskov |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,147,288 B1 | 9/2015 | Johnston |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,384,593 B2 | 7/2016 | Anttila |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,898,838 B2 | 2/2018 | Shim |
| 9,905,036 B2 | 2/2018 | Kim |
| 10,664,942 B2 | 5/2020 | Paltashev |
| 10,792,566 B1 | 10/2020 | Schmid |
| 11,717,753 B2 | 8/2023 | Raymond |
| 11,724,188 B2 | 8/2023 | Raymond |
| 11,833,423 B2 | 12/2023 | Raymond |
| 12,134,038 B2 | 11/2024 | Raymond |
| 12,134,039 B2 | 11/2024 | Raymond |
| 12,179,113 B2 | 12/2024 | Salik |
| 2003/0177187 A1* | 9/2003 | Levine ............ A63F 13/12 709/205 |
| 2004/0070595 A1 | 4/2004 | Atlas |
| 2005/0146524 A1 | 7/2005 | Gueziec |
| 2005/0179689 A1 | 8/2005 | Ohshima |
| 2005/0253843 A1 | 11/2005 | Losasso |
| 2006/0080072 A1 | 4/2006 | Lachman |
| 2007/0198363 A1 | 8/2007 | Quoc |
| 2007/0198364 A1 | 8/2007 | Quoc |
| 2008/0001963 A1 | 1/2008 | Lefebvre |
| 2008/0016176 A1* | 1/2008 | Leitner ............ H04L 67/131 709/217 |
| 2009/0062000 A1 | 3/2009 | Tanaka |
| 2009/0113448 A1 | 4/2009 | Smith |
| 2009/0253517 A1* | 10/2009 | Bererton ............ A63F 13/71 463/43 |
| 2009/0271821 A1 | 10/2009 | Zalewski |
| 2011/0063415 A1 | 3/2011 | Gefen |
| 2014/0198103 A1 | 7/2014 | Johansson |
| 2014/0344725 A1 | 11/2014 | Bates |
| 2015/0024852 A1 | 1/2015 | Pacey |

(56) References Cited

U.S. PATENT DOCUMENTS

| | | | |
|---|---|---|---|
| 2016/0191671 A1 | 6/2016 | Dawson | |
| 2017/0021274 A1* | 1/2017 | Vonderhaar | A63F 13/795 |
| 2017/0091992 A1 | 3/2017 | Rogers | |
| 2017/0200301 A1 | 7/2017 | Boissé | |
| 2018/0126276 A1* | 5/2018 | Shochet | A63F 13/45 |
| 2019/0192970 A1 | 6/2019 | Garbut | |
| 2019/0192972 A1 | 6/2019 | Garbut | |
| 2019/0286748 A1* | 9/2019 | Manoharan | G06F 16/951 |
| 2019/0355331 A1 | 11/2019 | Wood | |
| 2020/0001180 A1 | 1/2020 | Turner | |
| 2020/0045285 A1 | 2/2020 | Varerkar | |
| 2020/0269132 A1 | 8/2020 | Turner | |
| 2020/0368616 A1 | 11/2020 | Delamont | |
| 2021/0158597 A1 | 5/2021 | Hagland | |
| 2021/0194794 A1 | 6/2021 | Turner | |
| 2021/0329270 A1 | 10/2021 | Yea | |
| 2022/0019573 A1 | 1/2022 | Gautron | |
| 2022/0028161 A1 | 1/2022 | Lawrence | |
| 2022/0053224 A1 | 2/2022 | Katsumata | |
| 2022/0067052 A1* | 3/2022 | Chauhan | G06F 16/24578 |
| 2022/0096931 A1 | 3/2022 | Raymond | |
| 2022/0096932 A1 | 3/2022 | Raymond | |
| 2022/0096933 A1 | 3/2022 | Raymond | |
| 2023/0149813 A1 | 5/2023 | Kohler | |
| 2023/0372817 A1 | 11/2023 | Raymond | |
| 2023/0390639 A1 | 12/2023 | Raymond | |
| 2024/0165511 A1 | 5/2024 | Raymond | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Heok et al. "A Review on Level of Detail" Proceedings of the International Conference on Computer Graphics, Imaging and Visualization (CGIV'04) 2004 (Year: 2004).

Forsman, "Automatic LOD selection" Department of Science and Technology Linköping University Oct. 20, 2017 (Year: 2017).

Unity User Manual 2019.4 accessed from hhttps://web.archive.org/web/20200917105747/https://docs.unity3d.com/Manual/ class-LODGroup.html andhttps://web.archive.org/web/20200921105526/https://docs.unity3d.com/Manual/LevelOfDetail.html(Year: 2019).

\* cited by examiner

FIG. 2B (Cont.)

Auto generated variants

- 242 — Material variants: black, blue
- 244 — Role variants: Dead model, vehicle, destructible
- 246 — Environment variants: Dry, wet
- 248 — Locale variants: Euro, Cuba

240

- black_dead
- black_veh
- black_veh_wet
- black_veh_Euro
- black_veh_Euro_wet
- black_veh_Cuba
- black_veh_Cuba_wet
- black_dest
- black_dest_wet
- black_dest_Euro
- black_dest_Euro_wet
- black_dest_Cuba
- black_dest_Cuba_wet
- blue_dead
- blue_veh
- blue_veh_wet
- blue_veh_Euro
- blue_veh_Euro_wet
- blue_veh_Cuba
- blue_veh_Cuba_wet
- blue_dest
- blue_dest_wet
- blue_dest_Euro
- blue_dest_Euro_wet
- blue_dest_Cuba
- blue_dest_Cuba_wet

FIG. 2D

COMPUTER IMPLEMENTED METHOD OF SCALABLY GENERATING GAMING ASSETS FOR RENDERING DURING GAMEPLAY

CROSS-REFERENCE

The present application relies on U.S. Patent Provisional Application No. 63/263,957, titled "Computer Implemented Method of Scalably Generating Gaming Assets for Rendering During Gameplay" and filed on Nov. 12, 2021, for priority, which is herein incorporated by reference in its entirety.

FIELD

The present specification relates generally to gaming assets or objects. More specifically, the present specification relates to a computer implemented method of automatically generating customized gaming assets based on generic gaming assets and in a manner that is sufficiently scalable.

BACKGROUND

Video game publishers and developers need their games to attract, engage, and retain players for as long as possible. There exists a positive correlation between the success of video games and the level of engagement of the players, namely the longer or more frequently a player plays a video game, the more likely that the player enjoys the game, spends money within or on the game, and will play the game in the future. Thus, one of the challenges of video game development is to provide ways to ensure or increase the probability of an enjoyable player experience leading to heightened player involvement and participation.

One aspect of an improved player experience involves providing a rich variety of gaming assets or objects for players to experience and interact with during gameplay. To further enhance gaming fun, players are often offered options enabling them to customize these gaming assets based on an ever-increasing combination of features related to the gaming assets. For example, a player may be allowed to choose a type of vehicle asset from a number of in-game vehicles such as cars, trucks, buses, choppers, airplanes, bikes, or other modes of transportation. Each type of vehicle may further have a number of variations or customizations depending upon various parameters or attributes associated with the vehicle. For example, a truck may have multiple variations depending upon parameters related to colors, patterns, textures, cab and trolley attachments, accessories, in-game environment conditions, such as, dry, wet and snow, and functionalities, such as, whether the vehicle is a prop, drivable, and/or destructible. Similarly, the player may be allowed to choose a character, which would virtually represents the physical player during gameplay, from many options and then be allowed to customize the character based upon various parameters, such as, for example, visual appearance and model design, associated with aspects such as, but not limited to, attire, hairstyle, facial mask, facial makeup, shoes, and accessories. Still further, the player may be allowed to choose a weapon from a multitude of options and then be allowed to customize the weapon based upon various parameters, such as, for example, visual appearance and weapon accessories, associated with aspects such as, but not limited to, barrel, ammunition magazine, weight, among other parameters.

Artists typically need to manually design these gaming assets along with associated variations and customizations in order for these assets to be made available to players as options to choose from during gameplay. With the increasing number of gaming assets and the need to further provide an ever-increasing level of customization, the number of actual gaming assets that artists must manually design can quickly increase from dozens to hundreds to thousands. However, being a manual process, such creation of gaming assets along with associated customizations is neither efficient nor scalable.

Therefore, there is a need for a method to automatically generate custom gaming assets based on corresponding generic or high-level gaming assets. There is also a need for the method to be scalable and efficient.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer implemented method of generating a plurality of customized gaming assets for use in a video game, wherein each of the plurality of customized gaming assets is a customized version of a generic gaming asset and wherein each of the plurality of customized gaming assets is generated by a module executed by at least one host computer in data communication with a computing device, the method comprising: generating a first graphical user interface configured to present one or more gaming assets; receiving, via the first graphical user interface, a first response, wherein the first response is representative of first data indicative of a selected one of the one or more gaming assets; generating a second graphical user interface configured to present one or more parameters specific to the selected one of the one or more gaming assets; receiving, via the second graphical user interface, a second response, wherein the second response is representative of second data indicative of selected parameters of the one or more parameters; generating a third graphical user interface configured to present at least one relationship of at least two of the selected parameters; receiving, via the third graphical user interface, a third response, wherein the third response is representative of third data indicative of the at least one relationship between at least two of the selected parameters; generating the plurality of customized gaming assets based on the first, second and third responses, wherein the plurality of customized gaming assets comprises the one or more gaming assets being customized using combinations of the selected parameters and wherein the combinations are defined, at least in part, by the at least one relationship to yield a second one or more gaming asset; and causing the plurality of customized gaming assets to be displayed.

Optionally, the gaming asset is at least one of a vehicle, a character attire, a character hairstyle, character shoes, character accessories, or a weapon.

Optionally, the at least one relationship is that of requiring a second one of the selected parameters if a first one of the selected parameters is selected.

Optionally, the at least one relationship is that of eliminating a second one of the selected parameters if a first one of the selected parameters is selected.

Optionally, the method further comprises inserting at least one of the plurality of customized gaming assets within a game map of the video game for display on the computing device.

Optionally, the game map with the at least one of the plurality of customized gaming assets is displayed in a fourth graphical user interface.

Optionally, the fourth graphical user interface is associated with a game editor application executed on the at least one host computer.

Optionally, the at least one relationship is that of requiring a third one of the selected parameters only if a first one of the selected parameters is selected and if a second one of the selected parameters is selected.

Optionally, the at least one relationship is that of eliminating a third one of the selected parameters only if a first one of the selected parameters is selected and if a second one of the selected parameters is selected.

In some embodiments, the present specification discloses a computer readable non-transitory medium comprising a plurality of executable programmatic instructions wherein, when said plurality of executable programmatic instructions are executed by a processor in a computing device, a process for generating a plurality of customized gaming assets of a generic gaming asset for a video game is executed, wherein each of the plurality of customized gaming assets is a customized version of the generic gaming asset, and wherein each of the plurality of customized gaming assets is generated by a module executed by at least one host computer in data communication with a computing device, the plurality of executable programmatic instructions comprising: code adapted to generate a first graphical user interface configured to present one or more generic gaming assets; code adapted to receive, via the first graphical user interface, a first response, wherein the first response is representative of first data indicative of a selected one of the one or more generic gaming assets; code adapted to generate a second graphical user interface configured to present one or more parameters specific to the selected one of the one or more generic gaming assets; code adapted to receive, via the second graphical user interface, a second response, wherein the second response is representative of second data indicative of selected parameters of the one or more parameters; code adapted to generate a third graphical user interface configured to present at least one relationship of at least two of the selected parameters; code adapted to receive, via the third graphical user interface, a third response, wherein the third response is representative of third data indicative of the at least one relationship between at least two of the selected parameters; code adapted to generate the plurality of customized gaming assets based on the first, second and third responses, wherein the plurality of customized gaming assets comprises the generic gaming asset tailored using combinations of the selected parameters and wherein the combinations are defined, at least in part, by the at least one relationship; and code adapted to cause the plurality of customized gaming assets to be displayed.

Optionally, the generic gaming asset is at least one of a vehicle, a character attire, a character hairstyle, character shoes, character accessories, or a weapon.

Optionally, the at least one relationship is that of requiring a second one of the selected parameters if a first one of the selected parameters is selected.

Optionally, the at least one relationship is that of eliminating a second one of the selected parameters if a first one of the selected parameters is selected.

Optionally, the computer readable non-transitory medium further comprises code adapted to insert at least one of the plurality of customized gaming assets within a game map of the video game for display on the computing device.

Optionally, the game map with the at least one of the plurality of customized gaming assets is displayed in a fourth graphical user interface.

Optionally, the fourth graphical user interface is associated with a game editor application executed on the at least one host computer.

Optionally, the at least one relationship is that of requiring a third one of the selected parameters only if a first one of the selected parameters is selected and if a second one of the selected parameters is selected.

Optionally, the at least one relationship is that of eliminating a third one of the selected parameters only if a first one of the selected parameters is selected and if a second one of the selected parameters is selected.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2D illustrates a plurality of customized assets or objects of a generic asset or object, in accordance with some embodiments of the present specification;

DETAILED DESCRIPTION

Figure 1:
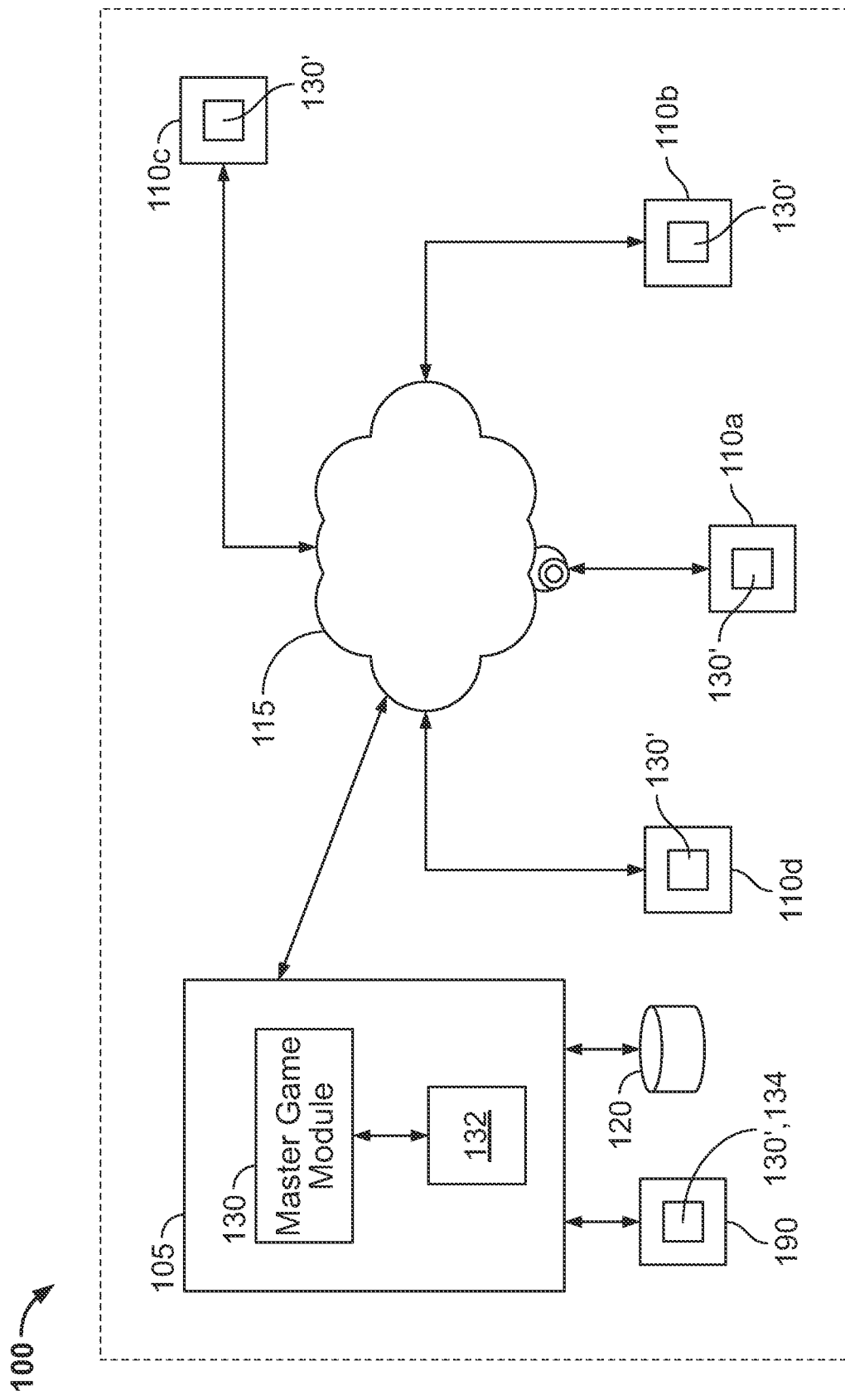
FIG. 1 illustrates a multi-player or massively multi-player online gaming platform/environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming platform" or "or massively multiplayer online game" may be construed to mean a specific hardware architecture in which one or more servers electronically communicate with, and concurrently support game interactions with, a plurality of computing devices, thereby enabling each of the computing devices to simultaneously play in the same instance of the same game. Preferably the plurality of computing devices number in the dozens, preferably hundreds, preferably thousands. In one embodiment, the number of concurrently supported computing devices ranges from 10 to 5,000,000 and every whole number increment or range therein. Accordingly, a multi-player gaming platform/environment or a massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "user" used in this disclosure may refer to a graphics artist or someone who is responsible for creating customized assets or objects for rendering in the game. The term "player" refers to a person involved in playing a game.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Overview

FIG. 1 illustrates an embodiment of a multi-player online gaming platform/environment or a massively multiplayer online gaming system/environment 100 in which the systems and methods of the present specification may be implemented or executed, in accordance with some embodiments. Persons of ordinary skill in the art would appreciate that while the systems and methods of the present specification are hereinafter described in the context of a multi-player online gaming platform/environment, in alternate embodiments the systems and methods of the present specification can also be implemented for single or multi-player offline gaming platform/environment.

Referring now to FIG. 1, the gaming platform 100 comprises at least one server or host computer 105 that is in data communication with one or more computing devices 110 over a network 115. Players may access the gaming platform 100 via the one or more computing devices 110 (110a, 110b, 110c and 110d). Additionally, a user such as, for example, a graphics artist may access the gaming platform 100 as well as various modules or engines via a computing device 190. The computing devices 110 comprise devices such as, but not limited to, personal or desktop computers, laptops, Netbooks, handheld devices such as smartphones, tablets, and PDAs, gaming consoles and/or any other computing platform known to persons of ordinary skill in the art. Although four computing devices 110a through 110d are illustrated in FIG. 1, any number of computing devices 110 can be in communication with the at least one server or host computer 105 over the network 115.

The at least one server or host computer 105 can be any computing device having one or more processors and one or more computer-readable storage media such as RAM, hard disk or any other optical or magnetic media. The at least one server or host computer 105 include a plurality of modules operating to provide or implement a plurality of functional, operational or service-oriented methods of the present specification. In some embodiments, the at least one server or host computer 105 include or are in communication with at least one database system 120. The database system 120 stores a plurality of game data including gaming assets or objects data associated with one or more games that are served or provided to the computing devices 110 over the network 115. In some embodiments, the at least one server or host computer 105 may be implemented by a cloud of computing platforms operating together as servers or host computers 105.

In accordance with aspects of the present specification, the at least one server or host computer 105 provides or implements a plurality of modules or engines such as, but not limited to, a master game module 130 and an assets creation module 132. The one or more computing devices 110 are configured to implement or execute one or more of a plurality of player-side modules some of which are same as or similar to the modules of the at least one server or host computer 105. In some embodiments each of the player computing devices 110a through 110d executes a player gaming module 130'. Alternatively, or additionally, in some embodiments, the game designer's computing device 190 may further integrate a user-side viewing application 134 (with the player gaming module 130') to access, view and interact with a plurality of GUIs (graphical user interfaces) generated by the assets creation module 132. In alternate embodiments, the game designer's computing device 190 may use a browser application to access, view and interact with a plurality of GUIs generated by the assets creation module 132.

While various aspects of the present specification are being described with reference to functionalities or programming distributed across modules or engines 130, 130', 132 and 134 on the server, player and game designer's sides, it should be appreciated that, in some embodiments, some or all of the functionalities or programming associated with these modules or engines may be integrated within fewer modules or in a single module—such as, for example, in the master game module 130 itself on the server side and in the gaming module 130' on the user side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the computing devices 110 and transmits updates to all computing devices 110 based on the received game data so that the game, on each of the computing devices 110, represents the most updated or current status with reference to interactions of all players with the game. Thus, the master game module 130 transmits game data over the network 115 to the computing devices 110 for use and rendering by the player gaming module 130' to provide local versions and current status of the game to the players.

On the player-side, each of the one or more computing devices 110 implements the player gaming module 130' that operates as a gaming application to provide a player with an interface between the player and the game. The player gaming module 130' generates the interface to render a virtual environment, virtual space, game space, map or virtual world associated with the game and enables the player to interact in the virtual environment to perform a plurality of game and other tasks and objectives. The player gaming module 130' accesses at least a portion of game data, received from the game server or host computer 105, to provide an accurate representation of the game to the player. The player gaming module 130' captures and processes player inputs and interactions within the virtual world or environment and provides at least a portion as updates to the game server or host computer 110 over the network 115.

On the game designer side, the computing device 190 enables the game designer to access, view and interact with a plurality of GUIs generated by the asset creation module 132 using either the user-side viewing application 134 that may be standalone or integrated with other software (such as, for example, the player gaming module 130') executing on the computing device 190 or using a browser application.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations. In some embodiments, the database system 120 may store a plurality of data such as, but not limited to, game data, gaming assets or objects data, and programming instructions with reference to various modules 130 and 132.

Asset Creation Module 132

In accordance with some aspects of the present specification, the asset creation module 132 implements a plurality of instructions or programmatic code to generate a plurality of graphical user interfaces (GUIs), for display on a game designer's computing device 190, to enable the game designer to create, and automate the generation of, an inventory of a plurality of variations, customizations or modifications of gaming assets or objects based on a plurality of parameters or attributes associated with the gaming assets or objects. It should be appreciated that the asset creation module 132 enables generation of customized assets of many different types of gaming assets or objects such as, but not limited to, vehicles, weapons, character models, character clothing or attire, character shoes, character accessories and character hairstyles.

In accordance with some aspects, the asset creation module 132 is configured to generate a first GUI on the game designer's computer 190 to enable the game designer to select data indicative of a generic asset or object, which may belong to a high-level class of assets or objects, from a displayed one or more classes, families or groups of assets or objects, for which the game designer desires to create and auto-generate one or more variants. As an example, the game designer may interact with the first GUI to select a 'car or sedan' as a generic asset or object from a 'vehicles' class of assets or objects for which variations or customizations need to be created. In another example, the user may interact with the first GUI to select a specific 'character outfit' as a generic asset or object from a 'characters' class of assets or objects for which variations or customizations need to be created. In yet another example, the user may interact with the first GUI to select an 'AK-47' as a generic asset or object from a 'weapons' class of assets or objects for which variations or customizations need to be created.

Figure 2A:
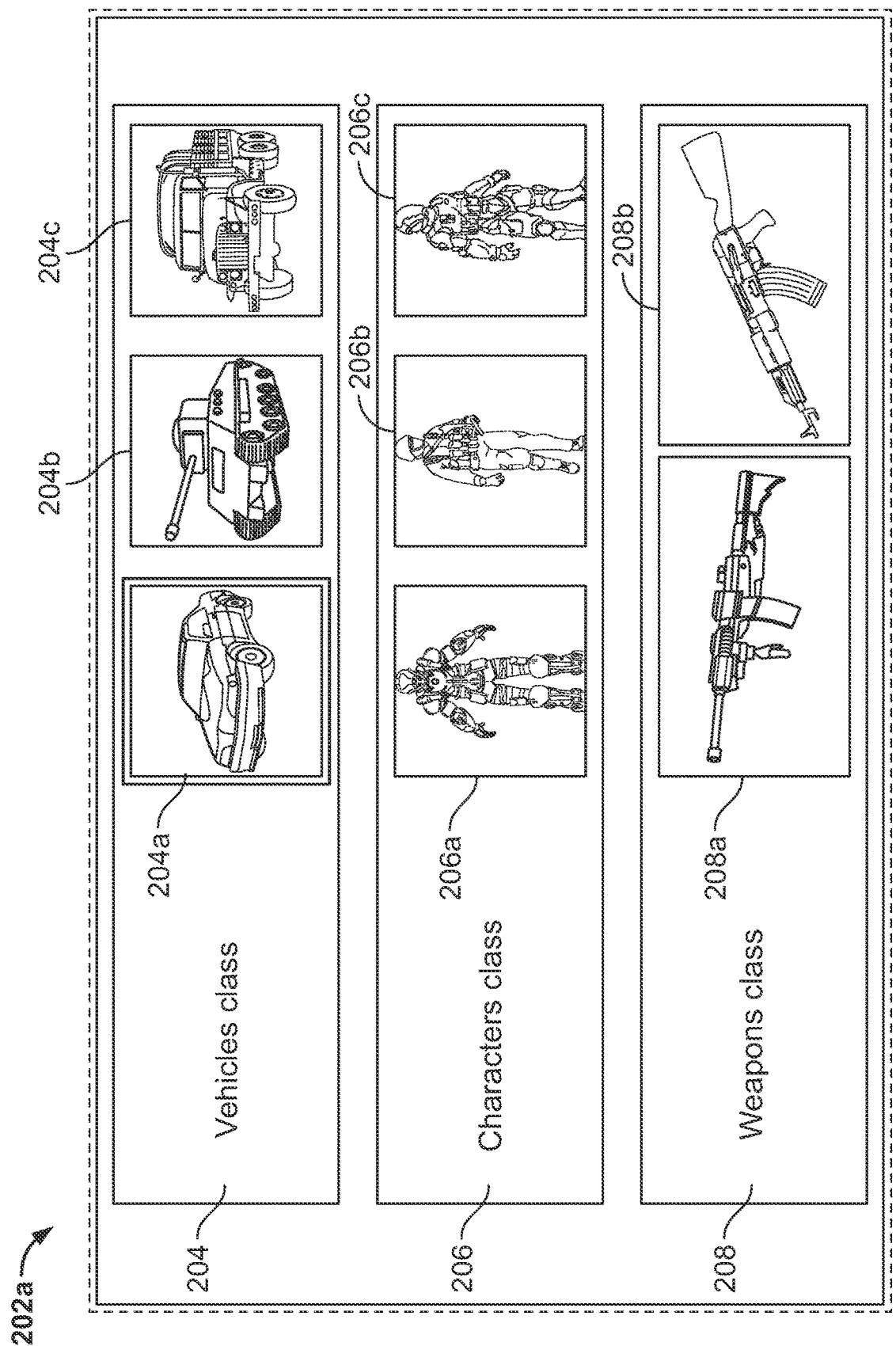
FIG. 2A depicts a first graphical user interface (GUI) displaying data indicative of a plurality of generic assets or objects, in accordance with some embodiments of the present specification.

FIG. 2A shows a first GUI 202a displaying data indicative of a plurality of generic assets or objects, in accordance with some embodiments of the present specification. As shown, the first GUI 202a has a first portion or area 204 that defines a first plurality of generic asset or object data 204a, 204b, 204c from a 'vehicles' class of assets or objects, a second portion or area 206 that defines a second plurality of generic asset or object data 206a, 206b, 206c from a 'characters' class, and a third portion or area 208 that defines a third plurality of generic asset or object data 208a, 208b from a 'weapons' class of assets or objects. In an example, the user has selected the sedan 204a as the generic asset or object, as noted by the additional outline around the sedan image, for which variations or customizations need to be created.

Once the game designer has selected a generic asset or object, such as, the sedan 204a from the first GUI 202a, the assets creation module 132 is configured to generate a second GUI to enable the user to select one or more data indicative of parameters or attributes from displayed plurality of parameters or attributes associated with the selected generic asset or object. In some embodiments, each of the displayed plurality of parameters or attributes is associated with a customizable category or aspect of the generic asset or object. For example, there may be a first customizable category or aspect of 'visual appearances, skins or materials', a second customizable category or aspect of 'models, attachments and/or accessories', a third customizable category or aspect of 'functions or roles', and/or a fourth customizable category or aspect of the 'environment' in which the asset or object is rendered in a game. In embodiments, the displayed plurality of parameters or attributes, and therefore the customizable categories or aspects, may vary depending upon the associated generic asset or object. For example, parameters or attributes related to 'visual appearances, skins or materials' would vary among vehicles, characters and weapons classes of assets or objects. Again, parameters or attributes related to 'functions or roles' may be pertinent to the vehicles class and perhaps not to the characters and weapons class of assets or objects. Thus, for a sedan exemplary set of parameters or attributes may include length, color, weight, speed, destructibility, wetness, snow, and/or locale variations such as, for example, US, EU and Japan.

Figure 2B:
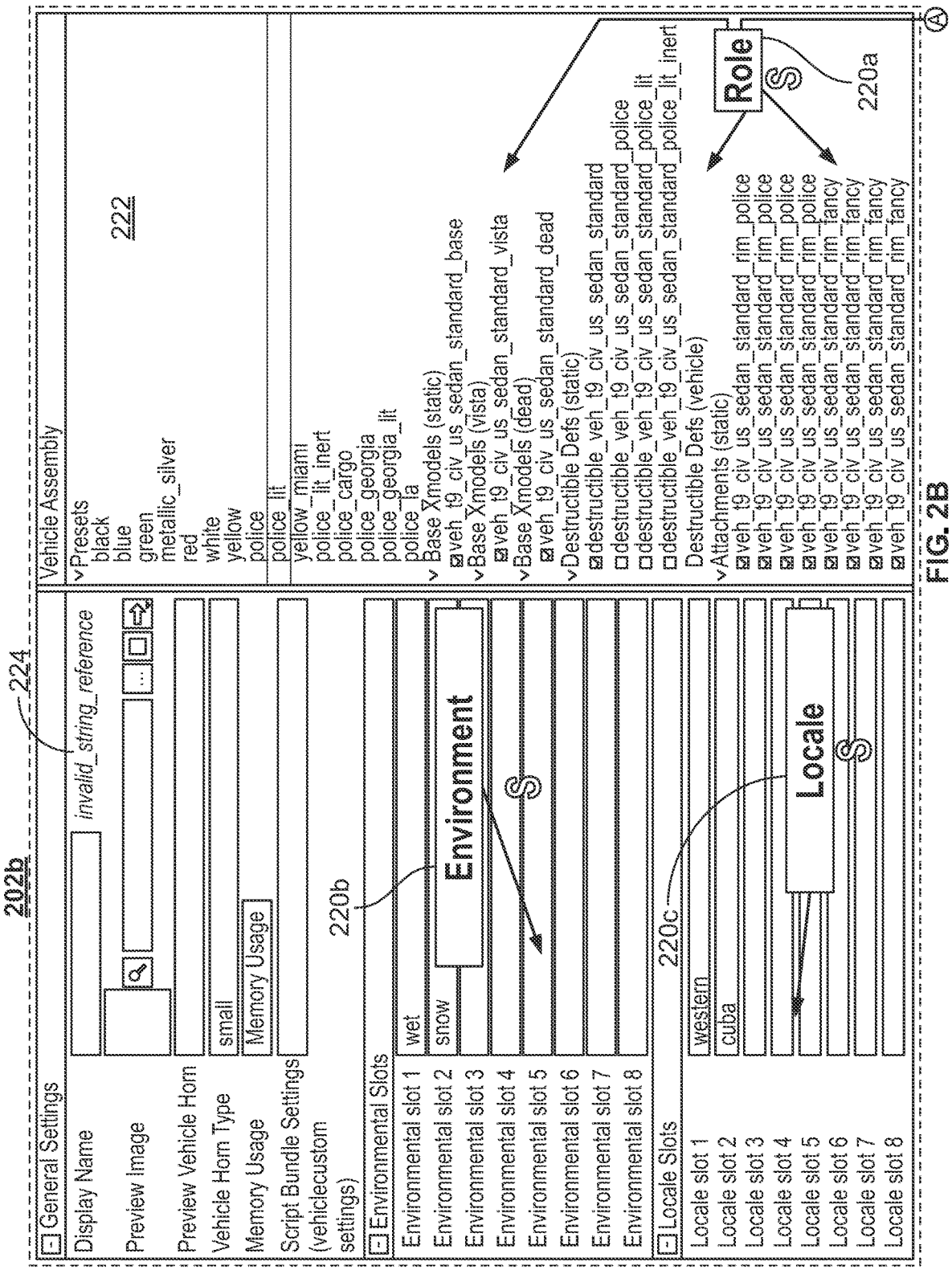
FIG. 2B depicts another GUI displaying a plurality of data indicative of parameters or attributes associated with a 'sedan' asset or object, in accordance with some embodiments of the present specification.
Figure 2B:
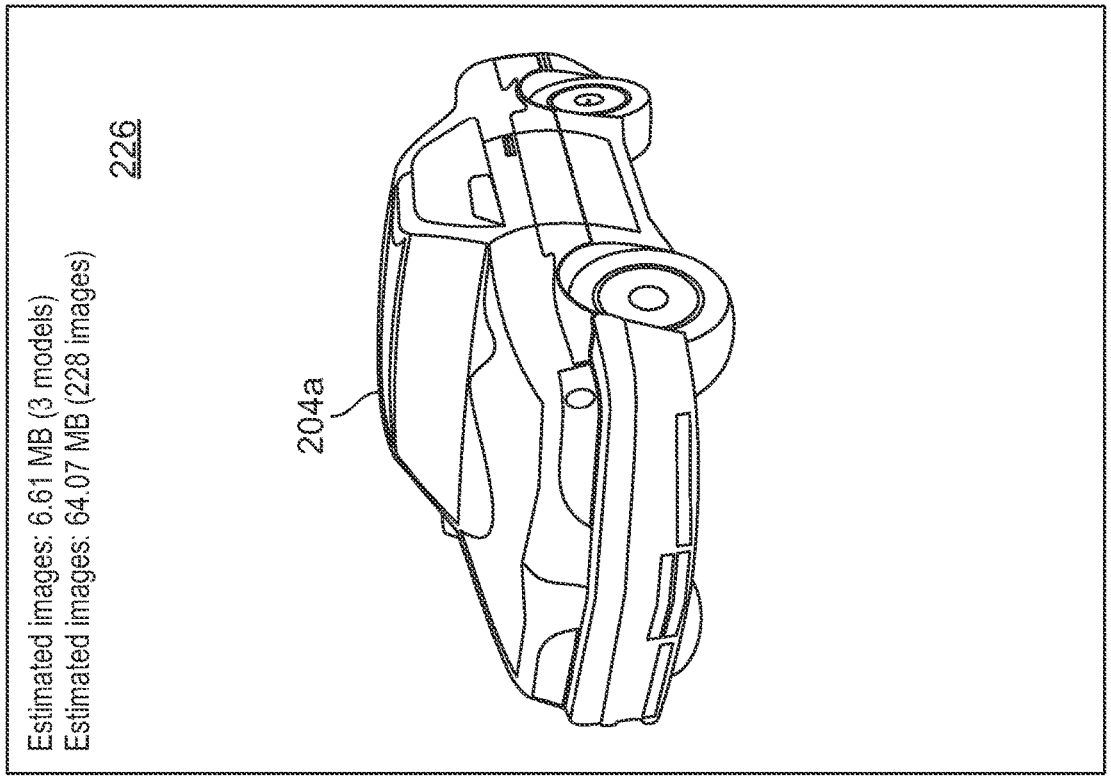

As a non-limiting illustration, in response to the game designer selecting the sedan 204a from the first GUI 202a, FIG. 2B shows a second GUI 202b displaying a plurality of data indicative of parameters or attributes associated with the sedan 204a asset or object, in accordance with some embodiments of the present specification. It should be appreciated that the picture of the sedan represents the asset at a first level of detail while the association of specific attributes with the sedan presents the asset at a second level of detail which is greater than the first. As shown, the second GUI 202b has a first portion or area 222 that displays a first plurality of data 220a indicative of parameters or attributes related to a first customizable category or aspect of 'functions or roles' (that is, whether the sedan 204a represents a static, destructible or player-drivable vehicle), and a second portion or area 224 that displays a second plurality of data 220b indicative of parameters or attributes related to a second customizable category or aspect of 'environment', that is, whether the sedan 204a should be rendered in dry, wet/rainy or snowy conditions in the game, and a third plurality of data 220c indicative of parameters or attributes related to a third customizable category or aspect of 'locale', that is, whether the sedan 204a carries, say, a US, EU or Cuban number plate in the game, is a right or left side driven vehicle, or whether the sedan 204a is being rendered in the game played in US, EU or Cuba, for example.

The first portion or area 222 also displays a fourth plurality of data 220d indicative of parameters or attributes related to a fourth customizable category or aspect of 'visual appearance, skin or material', that is, the color or texture in which the sedan 204a should be rendered in the game. The second GUI 202b includes a third portion or area 226 that displays at least one 3D view of the sedan 204a. In embodiments, the 3D view of the sedan 204a is updated, in real-time, to reflect the impact of the user selecting one or more of the first, second, third and fourth plurality of data 220a, 220b, 220c, 220d. Stated differently, the user is able to simultaneously view the customization effects, due to the selection of various parameters or attributes, on the sedan 204a asset or object.

In some embodiments, the asset creation module 132 is configured to further generate a third GUI to enable the user to define or establish relationship (or restrictions/constraints) among at least two of the plurality of parameters or attributes associated with the selected generic asset or object. In various embodiments, the relationship determines which parameters or attributes can be combined or selected concurrently by the game designer to generate variants of the generic asset or object and/or which parameters or attributes cannot be combined or selected simultaneously and are therefore part of restrictions/constraints. Stated differently, the GUI enables a linking between a second parameter and a first parameter such that when the first parameter is selected, the second parameter is automatically selected as well. Conversely, the GUI enables a delinking between a second parameter and a first parameter such that when the first parameter is selected, the second parameter is automatically negated, voided, or grayed out as a potential option.

Figure 2C:
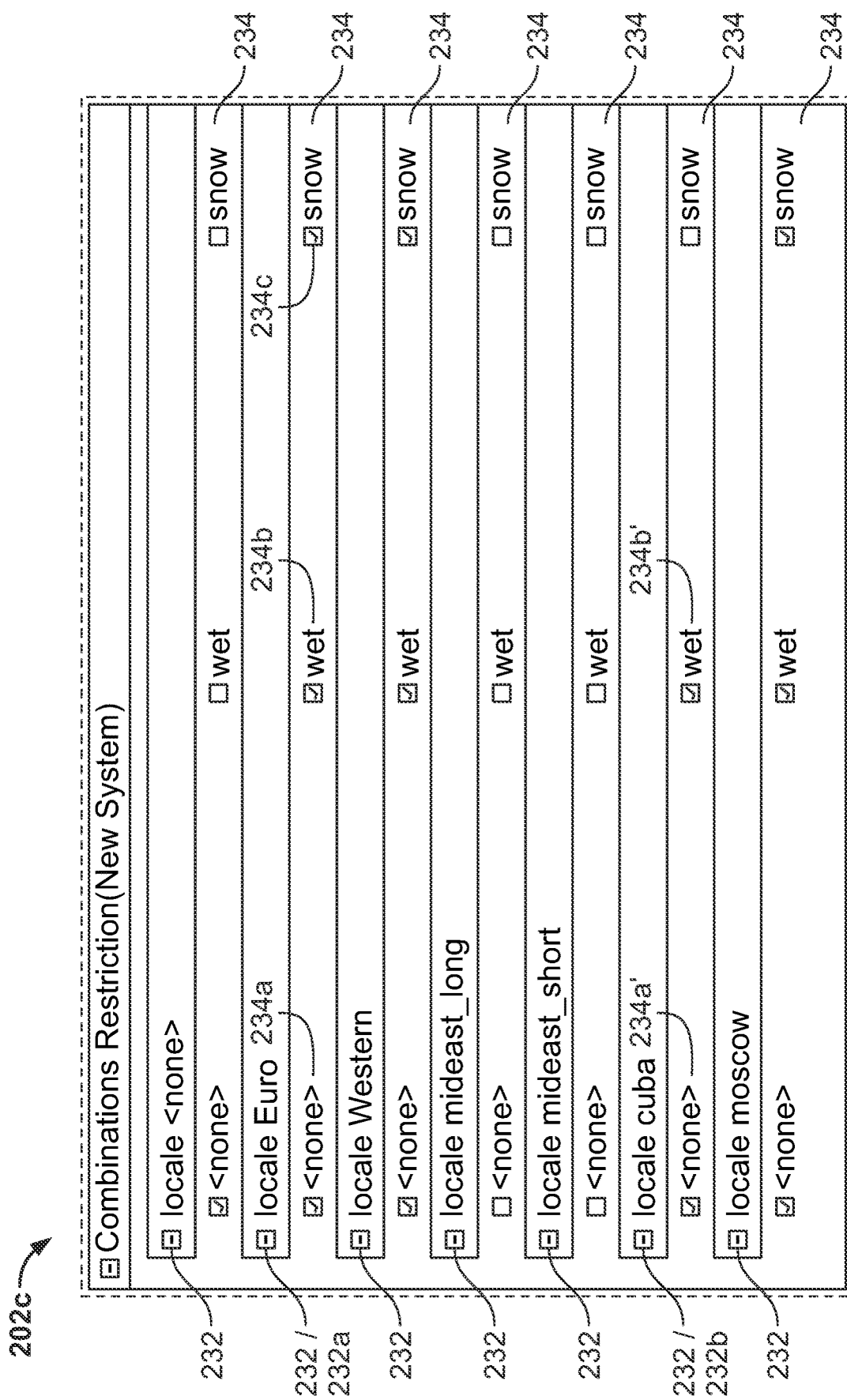
FIG. 2C depicts another GUI to enable the user to establish relationship between a first parameter or attribute and a second parameter or attribute, in accordance with some embodiments of the present specification.

FIG. 2C shows a third GUI 202c to enable the user to establish relationship between a first parameter or attribute and a second parameter or attribute, in accordance with some embodiments of the present specification. As a non-limiting example, the third GUI 202c enables the user to combine the 'locale' parameters or attributes 232 and the 'environment' parameters or attributes 234. Thus, for example, for the Euro 'locale' parameter or attribute 232a the game designer selects dry 234a, wet 234b and/or snow 234c 'environment' parameters or attributes. That is, for the Euro 'locale' variant of the sedan 204a (FIG. 2A), the game designer would like to auto-generate dry, wet and/or snow variations or customizations. On the other hand, for example, for the Cuba 'locale' parameter or attribute 232b the user selects only the dry 234a' and wet 234b' 'environment' parameters or attributes. That is, for the Cuba 'locale' variant of the sedan 204a, the user would like to auto-generate dry and wet variations or customizations and should not be permitted or enabled to auto-generate snow variations or customizations.

Accordingly, a relationship between a first parameter or attribute and a second parameter or attribute is established as follows: 1) a second one of the selected parameters (for example, dry 234a, wet 234b and/or snow 234c) is required if a first one of the selected parameters (for example, the Euro 'locale' parameter or attribute 232a) is selected, and/or 2) a second one of the selected parameters (for example, snow variations or customizations) is eliminated if a first one of the selected parameters is selected (for example, the Cuba 'locale' parameter or attribute 232b). In a similar manner, between first, second, and third parameters or attributes is such that a) of requiring a third one of the selected parameters only if a first one of the selected parameters is selected and if a second one of the selected parameters is selected, and/or b) eliminating a third one of the selected parameters only if a first one of the selected parameters is selected and if a second one of the selected parameters is selected. Thus, in general, based upon a selection of one attribute, another attribute may be required or may be eliminated as an available attribute when auto generating variants, as described below.

Based on the game designer's selections, inputs or responses received through the first, second and third GUIs 202a, 202b and 202c, the asset creation module 132 is configured to automatically generate one or more customized assets or objects of the generic asset or object, as selected in the first GUI 202a. FIG. 2D illustrates a plurality of customized assets or objects 240 of the sedan 204a (FIG. 2A), in accordance with some embodiments of the present specification. As an example, the plurality of customized assets or objects 240 are auto-generated based on the game designer selecting a) black and blue as parameters or attributes for a customizable category or aspect of 'visual appearance, skin or material' 242 for the sedan 204a (FIG. 2A), b) dead model, vehicle and destructible as parameters or attributes for another customizable category or aspect of 'functions or roles' 244 for the sedan 204a, c) dry and wet as parameters or attributes for a customizable category or aspect of 'environment' 246 for the sedan 204a, and d) Euro and Cuba as parameters or attributes for a customizable category or aspect of 'locale' 248 for the sedan 204a. Thus, the plurality of customized assets or objects 240 of the sedan 204a represent various permutation and combinations of the parameters or attributes 242, 244, 246 and 248. It should be appreciated that while FIG. 2D illustrates an inventory of the plurality of customized assets or objects 240 in textual format, in other embodiments each of the plurality of customized assets or objects 240 is shown to the user in graphical format (such as, for example, in 3D perspective view as illustrated in FIG. 2E).

Therefore, the present invention provides for the hierarchical selection of different types of variants, some of which are required based on the selection of other variants and some of which are impermissible based on the selection of other variants, as described above. Once the full hierarchical set of different types of variants are selected, the system automatically, and without human intervention, generates permissible combinations of the different types of variants to yield multiple instances of an asset for a video game, where each instance has a different combination of traits. Therefore, if a game designer is creating an urban landscape littered with cars, this approach can rapidly enable the game designer to generate, and subsequently place, different looking vehicles within the landscape.

Figure 2E:
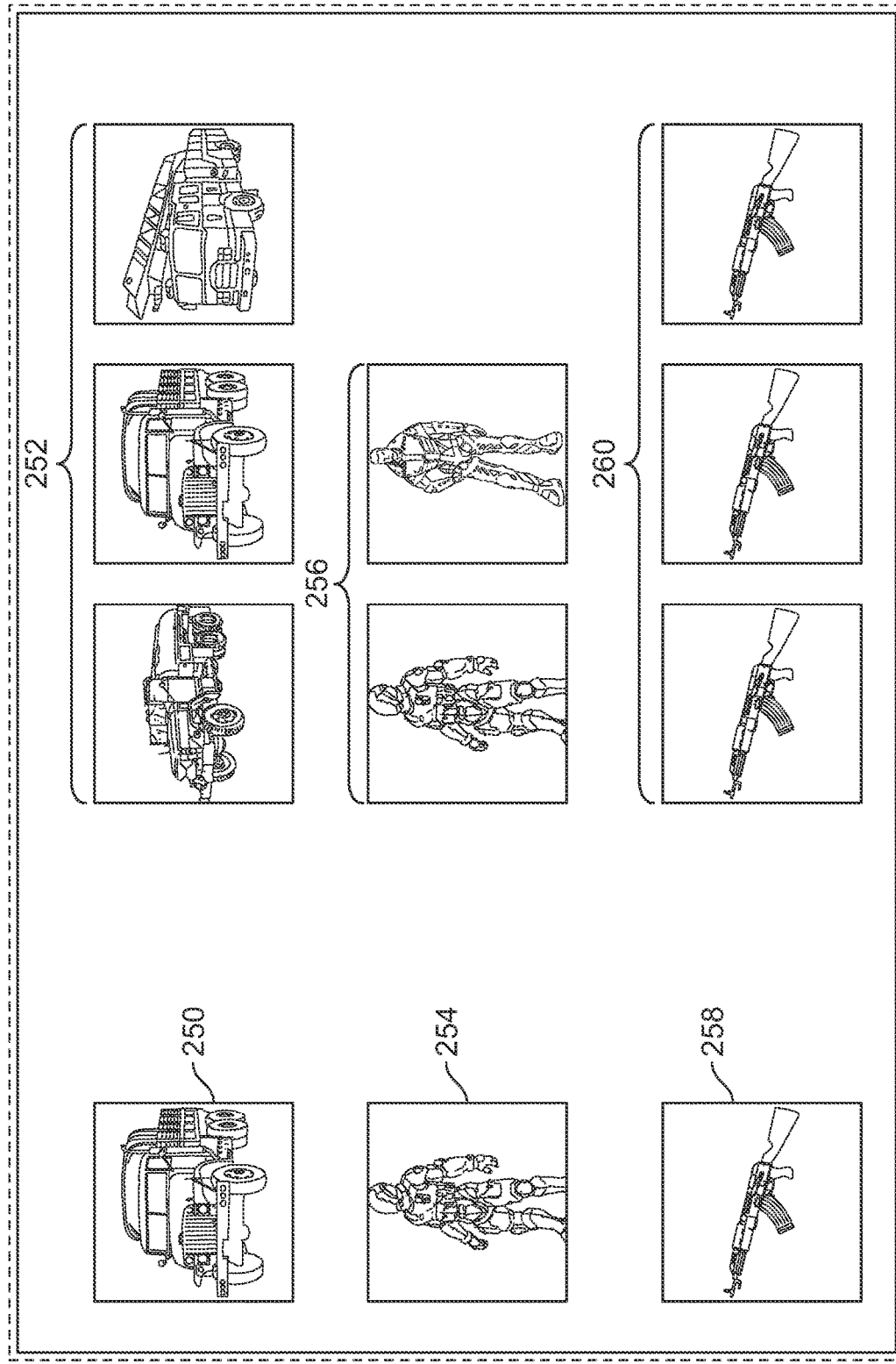
FIG. 2E depicts yet another GUI illustrating first, second and third plurality of auto-generated customized assets or objects, in accordance with some embodiments of the present specification.

FIG. 2E shows a GUI 202e illustrating first, second and third plurality of auto-generated customized assets or objects, in accordance with some embodiments of the present specification. As shown, the first plurality of auto-generated customized assets or objects 252 are variants of a first generic asset or object 250, which is a 'truck', the second plurality of auto-generated customized assets or objects 256 are variants of a second generic asset or object 254, which is a 'character', and the third plurality of auto-generated customized assets or objects 260 are variants of a third generic asset or object 258, which is an 'AK-47'.

Figure 2F:
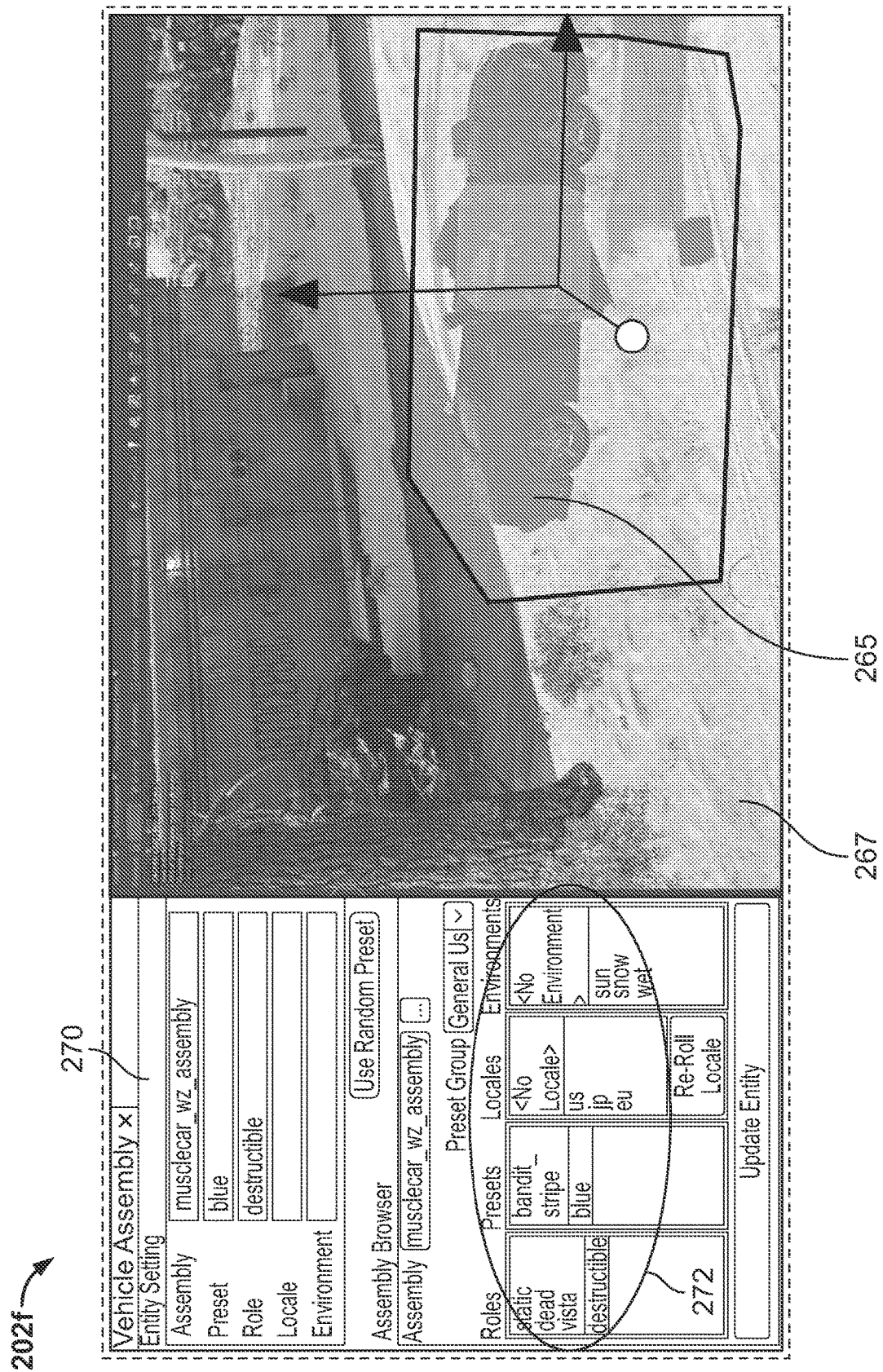
FIG. 2F depicts still another GUI with a customized asset or object positioned within a game map, in accordance with some embodiments of the present specification.

Finally, the asset creation module 132 is configured to place or position at least one auto-generated customized asset or object into the game map for viewing by the game designer. FIG. 2F shows a GUI 202f with a customized asset or object 265 being positioned within a game map 267, in accordance with some embodiments of the present specification. As an example, the GUI 202f shows the customized asset or object 265 being a 'car'. A portion or area 270 shows that the customized asset or object 265 has destructible (role), blue (visual appearance) and dry (environment) as the parameters or attributes 272 associated with the customized asset or object 265. As shown, in accordance with some embodiments, the customized asset or object 265 has roles, presets or visual appearances, locales and environments as the customizable categories or aspects.

In some embodiments, the asset creation module 132 is configured to enable the game designer to manually place the at least one auto-generated customized asset or object into the game map for viewing. In some embodiments, the asset creation module 132 is configured to automatically place the at least one auto-generated customized asset or object into the game map for viewing by the game designer. In some embodiments, the asset creation module 132 is configured to automatically place the at least one auto-generated customized asset or object into the game map when an exact position of an auto-generated customized asset or object in an environment of the game map is non-consequential or does not matter. As a non-limiting illustration, consider a battlefield environment (in a game map) that includes a plurality of burning and damaged vehicles scattered around. In such an environment, the game artist may not be concerned or care exactly where each of the plurality of vehicles is placed but rather, is simply focused on ensuring that the battlefield be generally filled with wreckage that is placed in a believable and reasonable fashion.

In some embodiments, the asset creation module 132 is in data communication with a game editor application that is accessible to the game designer through their computing device 190 (FIG. 1). The GUI 202f of FIG. 2F is an exemplary interface generated by the game editor application which is configured to generate the interface. Through the game editor application, the game designer provides customized assets or objects distribution inputs to the asset creation module 132 such as, but not limited to, a) defining at least one area of the game map environment (for example, the battlefield) that needs to be filled with vehicle wreckage and/or b) defining which of a plurality of auto-generated customized assets or objects (for example, vehicles or bodies) need to be used to fill the game map environment. For example, the game designer may choose that of the plurality of auto-generated customized assets or objects, which in this case are vehicles and/or bodies, 40% should be damaged trucks, 40% should be burning tanks and 20% should be charred bodies that fill the game map environment of a battlefield. Accordingly, in one embodiment, the system distributes game assets in predefined areas of game map based on a categorization provided by a game designer, wherein the categorization establishes proportions based on a certain trait.

The asset creation module 132 receives the customized assets or objects distribution inputs and is configured to automatically scatter or distribute the plurality of customized assets or objects into the game map environment. The asset creation module 132 is configured to implement a plurality of predefined, yet customizable, rules to ensure that the plurality of customized assets or objects are scattered or distributed randomly and intelligently. For example, the plurality of rules ensure that a damaged truck should not lie on top of a burning tank. Similarly, if there is a river or any other water body that runs through the battlefield then the plurality of rules ensures that none of the plurality of customized assets or objects is placed in the river. In some embodiments, the game artist may (additionally or alternatively) use the game editor application to instruct the asset creation module 132 to subtract or cut out the river from the area of the battlefield. Resultantly, the asset creation module 132 is configured to place the plurality of customized assets or objects on land, on the riverbanks, but not in the river itself. Accordingly, in one embodiment, the system is configured to automatically distribute game assets in a virtual landscape based on a) the traits of the game asset and b) to what extent the trait is compatible or incompatible with the traits of the virtual landscape. For example, a building or vehicle has a trait of being on land while a body of water has the trait of not being land. Therefore, the system would not automatically place building or vehicle assets on a body of water. Similarly, boulders, rocks, cars, tanks, and other such game assets have the trait of being on the ground or on a supported structure. Therefore, the system would not automatically place such assets such that they are floating in the air since that has the trait of not being grounded or supported by a structure. One of ordinary skill in the art would understand other similar trait compatibility tests exist and fall within the scope of this invention.

Figure 3:
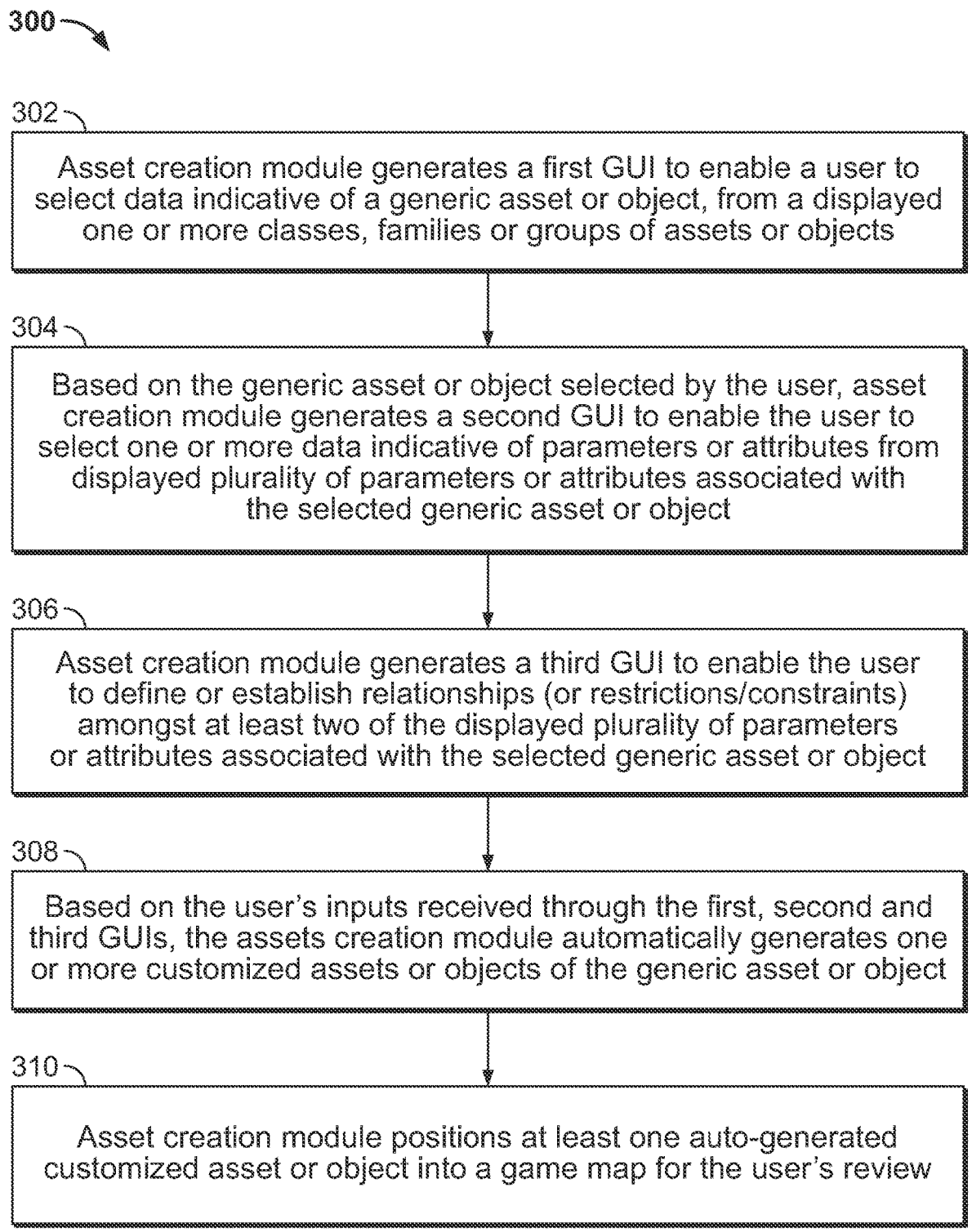
FIG. 3 is a flowchart of a plurality of exemplary steps of a method of automatically generating one or more customized assets or objects of a generic asset or object, in accordance with some embodiments of the present specification.

FIG. 3 is a flowchart of a plurality of exemplary steps of a method 300 of automatically generating one or more customized assets or objects of a generic asset or object, in accordance with some embodiments of the present specification. In embodiments, the method 300 is implemented by the asset creation module 132 (FIG. 1).

At step 302, the asset creation module 132 generates a first GUI (for display on the user's computing device 190) to enable the game designer to select data indicative of a generic asset or object (that may belong to a high-level class of assets or objects), from displayed one or more classes, families or groups of assets or objects, for which the game designer desires to create and auto-generate one or more customized assets or objects.

At step 304, based on the generic asset or object selected by the game designer, the asset creation module 132 generates a second GUI for display on the game designer's computing device 190 to enable the game designer to select one or more data indicative of parameters or attributes from displayed plurality of parameters or attributes associated with the selected generic asset or object.

At step 306, the asset creation module 132 generates a third GUI for display on the game designer's computing device 190 to enable the game designer to define or establish relationships or restrictions/constraints among at least two of the displayed plurality of parameters or attributes associated with the selected generic asset or object.

At step 308, based on the game designer's selections, inputs or responses received through the first, second and third GUIs, the asset creation module 132 automatically generates one or more customized assets or objects of the generic asset or object, selected in the first GUI, for display in a fourth GUI on the game designer's computing device 190.

Finally, at step 310, the asset creation module 132 places or positions at least one auto-generated customized asset or object, selected or chosen by the user, into a game map for display on the game designer's computing device 190. In some embodiments, the at least one auto-generated customized asset or object positioned within the game map is displayed in a fifth GUI. In some embodiments, the fifth GUI is associated with a game editor application executed on the at least one server 105 and/or on the game designer's computing device 190. In some embodiments, the asset creation module 132 automatically places or positions the at least one auto-generated customized asset or object into the game map. In some embodiments, the game designer manually places or positions the at least one auto-generated customized asset or object into the game map.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer implemented method of generating a plurality of customized gaming assets for use in a video game, wherein each of the plurality of customized gaming assets is a customized version of a generic gaming asset and wherein each of the plurality of customized gaming assets is generated by a module executed by at least one host computer in data communication with a computing device, the method comprising:

generating a first graphical user interface configured to present one or more gaming assets;

receiving, via the first graphical user interface, a first response, wherein the first response is representative of first data indicative of a selected one of the one or more gaming assets;

generating a second graphical user interface configured to present one or more parameters specific to the selected one of the one or more gaming assets;

receiving, via the second graphical user interface, a second response, wherein the second response is representative of second data indicative of selected parameters of the one or more parameters;

generating a third graphical user interface configured to present at least one relationship of at least two of the selected parameters;

receiving, via the third graphical user interface, a third response, wherein the third response is representative of third data indicative of the at least one relationship between at least two of the selected parameters;

generating the plurality of customized gaming assets based on the first, second and third responses, wherein the plurality of customized gaming assets comprises the one or more gaming assets being customized using combinations of the selected parameters and wherein the combinations are defined, at least in part, by the at least one relationship to yield a second one or more gaming asset; and causing the plurality of customized gaming assets to be displayed.

2. The computer implemented method of claim 1, wherein the gaming asset is at least one of a vehicle, a character attire, a character hairstyle, character shoes, character accessories, or a weapon.

3. The computer implemented method of claim 1, wherein the at least one relationship is that of requiring a second one of the selected parameters if a first one of the selected parameters is selected.

4. The computer implemented method of claim 1, wherein the at least one relationship is that of eliminating a second one of the selected parameters if a first one of the selected parameters is selected.

5. The computer implemented method of claim 1, further comprising inserting at least one of the plurality of customized gaming assets within a game map of the video game for display on the computing device.

6. The computer implemented method of claim 5, wherein the game map with the at least one of the plurality of customized gaming assets is displayed in a fourth graphical user interface.

7. The computer implemented method of claim 6, wherein the fourth graphical user interface is associated with a game editor application executed on the at least one host computer.

8. The computer implemented method of claim 1, wherein the at least one relationship is that of requiring a third one of the selected parameters only if a first one of the selected parameters is selected and if a second one of the selected parameters is selected.

9. The computer implemented method of claim 1, wherein the at least one relationship is that of eliminating a third one of the selected parameters only if a first one of the selected parameters is selected and if a second one of the selected parameters is selected.

10. A computer readable non-transitory medium comprising a plurality of executable programmatic instructions wherein, when said plurality of executable programmatic instructions are executed by a processor in a computing device, a process for generating a plurality of customized gaming assets of a generic gaming asset for a video game is executed, wherein each of the plurality of customized gaming assets is a customized version of the generic gaming asset, and wherein each of the plurality of customized gaming assets is generated by a module executed by at least one host computer in data communication with a computing device, the plurality of executable programmatic instructions comprising:
  code adapted to generate a first graphical user interface configured to present one or more generic gaming assets;
  code adapted to receive, via the first graphical user interface, a first response, wherein the first response is representative of first data indicative of a selected one of the one or more generic gaming assets;
  code adapted to generate a second graphical user interface configured to present one or more parameters specific to the selected one of the one or more generic gaming assets;
  code adapted to receive, via the second graphical user interface, a second response, wherein the second response is representative of second data indicative of selected parameters of the one or more parameters;
  code adapted to generate a third graphical user interface configured to present at least one relationship of at least two of the selected parameters;
  code adapted to receive, via the third graphical user interface, a third response, wherein the third response is representative of third data indicative of the at least one relationship between at least two of the selected parameters;
  code adapted to generate the plurality of customized gaming assets based on the first, second and third responses, wherein the plurality of customized gaming assets comprises the generic gaming asset tailored using combinations of the selected parameters and wherein the combinations are defined, at least in part, by the at least one relationship; and
  code adapted to cause the plurality of customized gaming assets to be displayed.

11. The computer readable non-transitory medium of claim 10, wherein the generic gaming asset is at least one of a vehicle, a character attire, a character hairstyle, character shoes, character accessories, or a weapon.

12. The computer readable non-transitory medium of claim 10, wherein the at least one relationship is that of requiring a second one of the selected parameters if a first one of the selected parameters is selected.

13. The computer readable non-transitory medium of claim 10, wherein the at least one relationship is that of eliminating a second one of the selected parameters if a first one of the selected parameters is selected.

14. The computer readable non-transitory medium of claim 10, further comprising code adapted to insert at least one of the plurality of customized gaming assets within a game map of the video game for display on the computing device.

15. The computer readable non-transitory medium of claim 14, wherein the game map with the at least one of the plurality of customized gaming assets is displayed in a fourth graphical user interface.

16. The computer readable non-transitory medium of claim 15, wherein the fourth graphical user interface is associated with a game editor application executed on the at least one host computer.

17. The computer readable non-transitory medium of claim 10, wherein the at least one relationship is that of requiring a third one of the selected parameters only if a first one of the selected parameters is selected and if a second one of the selected parameters is selected.

18. The computer readable non-transitory medium of claim 10, wherein the at least one relationship is that of eliminating a third one of the selected parameters only if a first one of the selected parameters is selected and if a second one of the selected parameters is selected.

* * * * *